May 10, 1960
W. S. RAINFORD
2,936,366
INFLATABLE GLOBE
Filed Sept. 19, 1958
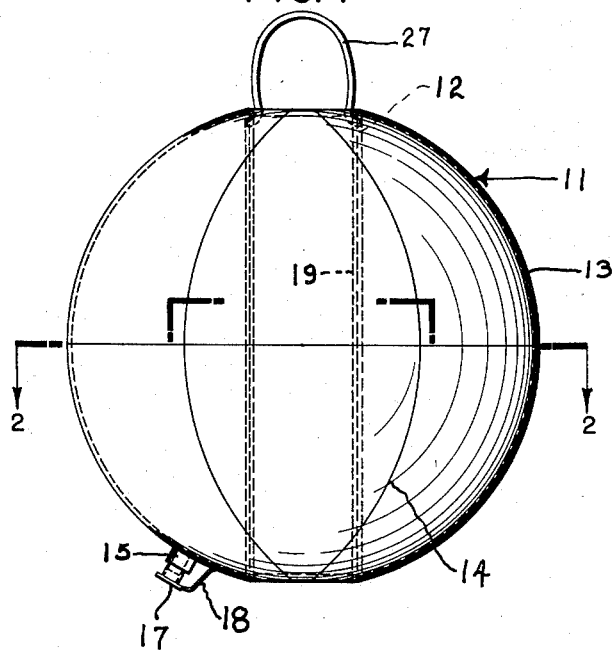
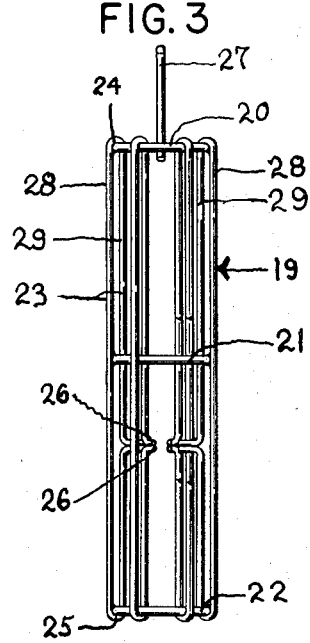
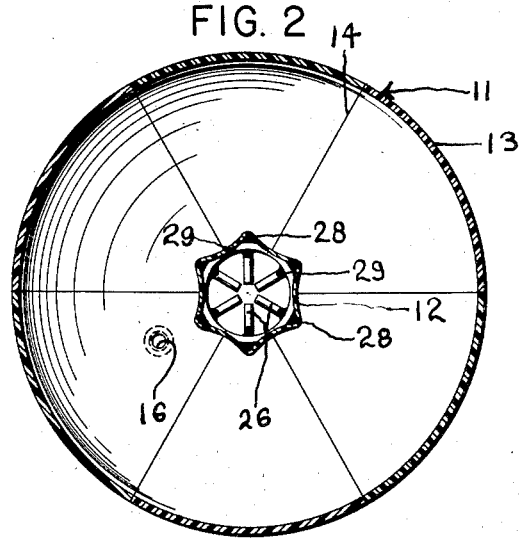
*INVENTOR.*
WARREN S. RAINFORD
BY Norman N. Popper
ATTORNEY 2,936,366

INFLATABLE GLOBE

Warren S. Rainford, Miami, Fla.

Application September 19, 1958, Serial No. 761,985

2 Claims. (Cl. 240—10)

My invention relates generally to inflatable globes and specifically to an inflatable globe having a frame therein to receive an illuminating means.

It is among the objects of my invention to provide an inflatable globe having a frame to receive an incandescent lamp.

It is a further object of my invention to provide an inflatable globe which may function as a Japanese lantern.

It is a further object of my invention to provide an inflatable globe which may be used as an advertising medium.

Yet another object of my invention is to provide an inflatable globe which may function as an illuminated map of the world.

Yet a further object of my invention is to provide an inflatable globe with an axial polar passage.

Yet another object of my invention is to provide an inflatable globe which is durable, attractive and relatively inexpensive.

These objects and advantages, as well as other objects and advantages, may be achieved by the device illustrated in the drawings, in which Figure 1 is a side elevational view;

Figure 2 is a sectional view taken on the lines 2—2 in Figure 1;

Figure 3 is a side elevational view of the cage.

There are numerous uses for inflatable globes. If such globes are provded with an axial passage, illuminating means may be inserted therein. Such globes may be used for decorative purposes, as ornaments, as lanterns, as a foundation for an imprinted map of the world, as Christmas tree ornaments, and for numerous other purposes. When no longer in use, they may be conveniently collapsed and stored and require a minimum amount of space for storage.

Referring now to the drawings in detail, the practice of my invention provides a globe 11. The globe is provided with a tubular central passage 12. The outer wall 13 may be spherical or it may be formed so that when it is inflated, it has a square, triangular or ribbed cross-section. It may also be endowed with numerous other shapes. It is well known to manufacture globes of rubber or plastic sheeting by cementing or electronically welding together a series of identical gores 14, which may be ellipsoidal in shape with their pointed ends collected together at the poles of the globe or sphere. The tubular central passage 12 may then have its edges adhesively secured to the edges of the gores 14, 14. An inflation port 15 may be adhesively secured to an aperture 16 in the globe 11 and a plug 17 can be applied to stop the aperture 16. The plug 17 may have a tail-piece 18 to secure it to the globe 11 so that it will not be lost. The tubular wall 12 defines a central passage extending from the top pole to the bottom pole of the sphere 11. Of course this passage, which is shown to be in polar-axial position may be disposed in equitorial axial position or eccentrically positioned with respect to the chosen axis of the globe. A frame 19 is provided whose overall dimensions are such that it may be readily inserted in the central passage 12 defined by the central tube 12 when the globe is not inflated or is slightly inflated. When the globe is fully inflated the wall 12 of the central passage will display a tendency to deform inwardly and constrict under the impetus of inflation and will frictionally engage the cage 19 to prevent it from being discharged from its engagement with the wall 12. This engagement is shown in Figure 2. The cage 19 may be formed in many ways, only one of which I have illustrated. It is a frame having a top ring 20, a central ring 21 and a bottom ring 22. These rings 20, 21, 22 are united together by vertical ribs 23 which are folded over at each of their opposite ends 24, 25 from which point they extend respectively downwardly and upwardly until they meet, at which point their ends 26 are bent inwardly to define a seat for an illumination means such as an incandescent lamp. It will be noted that the ends 26 are not equidistant from the ends 24, 25. Thus, the seat shown in Figure 3 above the ends 26, 26 is deeper than the seat shown in Figure 3 below the ends 26, 26. Thus, different size incandescent lamps may be accommodated. A handle 27 resiliently engages the top ring 20 but may be deformed inwardly, disengaged from the cage 19, and reengaged with the opposite end by being brought in contact with the bottom ring 22, in which case the cage may be inverted and have the seat defined by the ends, 26, 26 nearer the top, thereby accommodating a different size incandescent lamp.

The ribs or vertical bars 23 have an outside portion 28 and an inside portion 29. The inside portion or rib is spaced away from the central tubular wall 12 in order to maintain the incandescent lamp spaced away from that central wall 12. This insures against damage of the central wall 12 by contact with the envelope of the incandescent lamp, the heat of which might impair the rubber, plastic, or other material of which the globe is made. The cage 19 functions as a chinney or a conduit through which a current of air passes. With the incandescent lamp seated in the cage 19, the inside portion 29 of the vertical bars 23 and the outside portion 28 serve to space the central wall 12 away from the incandescent lamp's envelope. The heated air rises through the cage and is displaced by cooler air rising continuously from below. Thus, the inflatable globe does not become overheated by the incandescent lamp since the central wall is constantly cooled by a moving current of air rising through the central passage. This type of construction has the advantage of permitting the globe to be deflated for easy storage and easily reinflated. When the globe is collapsed, it is readily stored in a small space. When inflated, its numerous uses may be readily enhanced by the insertion of illumination means.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. An inflatable globe comprising an outer wall with opposed polar apertures, an inner tubular wall connected to the edges of the apertures, the outer wall and inner wall defining a generally spherical hermetic envelope with a generally polar axial passage therethrough, a valve means in the hermetic envelope, a plurality of outer and inner rods attached together and defining a frame, the inner rods positioned inwardly in spaced relation to the outer rods, the frame positioned in the passage and frictionally engaged with the wall thereof and against displacement from the passage when the envelope is inflated, radial ends on the rods defining a seat for an illumination means, and a suspension means attached to the frame.

2. An inflated globe comprising an outer wall with opposed polar apertures, an inner tubular wall connected to the edges of the apertures, the outer wall and inner wall defining a generally spherical hermetic envelope with a generally polar axial passage therethrough, a valve means in the hermetic envelope, a plurality of outer rods attached together and defining a frame, the frame positioned in the passage and frictionally engaged with the wall thereof and against displacement from the passage when the envelope is inflated, a plurality of inner rods connected to the outer rods and extending inwardly therefrom in spaced relation to the outer rods, the inner rods defining a seat for an illumination means.

References Cited in the file of this patent

UNITED STATES PATENTS

| | | |
|---|---|---|
| 1,912,960 | Aki et al. | June 6, 1933 |
| 2,871,343 | Whitney | Jan. 27, 1959 |